United States Patent [19]

Mondshein

[11] 4,418,278
[45] Nov. 29, 1983

[54] EMBEDDED OPTIC FIBER PAGE

[76] Inventor: Lee F. Mondshein, 31 Green Park, Newton, Mass. 02158

[21] Appl. No.: 265,533

[22] Filed: May 20, 1981

[51] Int. Cl.³ .......................................... G06K 19/00
[52] U.S. Cl. .................................... 235/487; 235/473; 235/488
[58] Field of Search .................. 235/473, 488, 487; 340/815.31; 455/612

[56] References Cited

U.S. PATENT DOCUMENTS

| | | | |
|---|---|---|---|
| 3,728,521 | 4/1973 | Borough | 235/488 |
| 3,872,236 | 3/1975 | Swengel | 340/815.31 |
| 4,011,543 | 3/1977 | Soref | 455/612 |
| 4,021,664 | 5/1977 | Ormsby | 340/815.31 |
| 4,104,618 | 8/1978 | Townsend | 340/815.31 |
| 4,254,407 | 3/1981 | Tipon | 455/612 |

FOREIGN PATENT DOCUMENTS

2022300 12/1979 United Kingdom ................ 235/487

*Primary Examiner*—Harold I. Pitts
*Attorney, Agent, or Firm*—Weingarten, Schurgin, Gagnebin & Hayes

[57] ABSTRACT

A page fabricated with embedded optical fibers is used as an input/output device to facilitate man-machine communication. Pinhole-size perforations in the surface of the page serving as entry/exit ports are located above ends of the embedded optical fibers, thereby to expose the ends of the fibers to the top surface of the page, with the fibers being routed beneath the surface of the page to exit points at the edge of the page. As an input device, information is entered by marking the page with a pencil such that pencil lead is deposited in a selected perforation to prevent light from passing through the perforation in the page and into the underlying optical fiber, the state of the fiber being detected and converted into one bit of information. The user's actions in marking the page may be guided by pictures and words printed on the page, which may be made of paper. As an output device, selected optical fibers are driven with a light source which results in a display of information by light emanating from the perforations at the ends of the driven fibers. In a further embodiment, a light path is established by a fiber embedded in the page, in which the fiber is separated along its length at a point under a perforation, with occluding material deposited through the perforation for blocking transmission of light through the fiber. In another embodiment a matrix of fibers is embedded in a page, with connections of a row and a column at a crossover point being provided by a coupling fiber spliced therebetween, the coupling fiber being separated under a perforation in the paper through which occlusive material may be deposited to selectively block the optical coupling between the row and column. In a still further embodiment, the embedded fiber optic page may be used with either light-detecting or light-emitting pens.

4 Claims, 21 Drawing Figures

EMBEDDED OPTIC FIBER PAGE

FIELD OF INVENTION

This invention relates to a method and apparatus for man-machine information transfer and more particularly, to an embedded optic fiber page operative as an input or output device.

BACKGROUND OF THE INVENTION

It has long been recognized that full utilization of computers requires convenient devices for man-machine communication. Among such devices are manual keyboards, computer graphics terminals, and voice-recognition systems. By contrast, the most widespread medium for communication between man and man, apart from speech, is the printed page. It has been a goal, ever since the development of the digital computer, to provide convenient man-machine interfaces such that the conveying of information to and from a computer is effected with minimum expense, training time, and distraction to the user thereby to establish greater utilization of the computing power afforded by digital computers. In the past, keyboard actuated systems have been utilized as input devices, as well as such devices as punched cards, optical readers, and graphics tablets.

It will be appreciated that the above mentioned input devices involve auxiliary equipment which can be costly or bulky. Moreover, with keyboard-oriented devices, entry of information frequently is based on a formal man-machine dialogue which may impose obtrusive or annoying mental steps upon the user. Note that mental manipulations required for the entry of information in this manner are somewhat removed from the normal way in which human beings communicate via the written word. In addition, keyboard entry requires a certain amount of typing skill. The disadvantages of graphical input devices include the cost of the hardware and lack of easy portability.

In another class of input/output (I/O) devices, fiber optics have been utilized in the past to provide a coding system for the entry of information into a computer. For instance, fiber optics have been utilized as illustrated in U.S. Pat. No. 3,612,888 for reading a punched card containing information. In this patent, the optical fibers are used not only to detect the presence or absence of light coming through the card at a particular location, but are also utilized to establish a predetermined code by virtue of the routing of the optical fibers.

Moreover, encoding has been accomplished by embedding fiber optic elements in a card such as illustrated in U.S. Pat. No. 3,728,521. In this patent, fibers exposed to the edges of the card are individually illuminated by light sources. Coding for the card is accomplished by internally severing a predetermined fiber and by providing occluding material at the severed point, thereby to prevent light from traveling from one end of the fiber to another. The non-illuminated ends of the fibers are provided with detectors so as to permit decoding of the state of the fiber optic transmission path.

One of the problems with the encoded card described in U.S. Pat. No. 3,728,521 is that the encoding is accomplished prior to final lamination of the fibers into the card. The coding is therefore fixed at the time of manufacture and is not readily alterable by a user either to change the code or to enter information other than that which was originally encoded. Thus, while fiber-optic coded cards have been utilized in the past as input devices, the coding has been fixed or at least not readily alterable by the user. This is also true, for instance, with respect to fiber optic coded keys which are precoded and utilized in the manner of a traditional key.

SUMMARY OF THE INVENTION

An exceptionally simple, portable means for man-machine input/output is provided by a page fabricated with embedded optical fibers, the ends of which are exposed beneath small apertures in the top surface of the page. These apertures serve as entry or exit ports for information input or display. Specifically, information input is accomplished by occluding or marking of the apertures by the user. Such marks result in the blocking of optical paths through the embedded fibers. The presence or absence of light in a particular path is then detected electronically. Thus, one bit of information is provided opto-electronically, in direct correspondence with the presence or absence of a mark applied to the page.

Information output is accomplished by utilizing electronically driven light sources. Because ends of the fibers are exposed through apertures in the page, light can be made to exit an aperture by driving a source at the non-embedded end of a fiber. In the case of both input and output, the presence of printed text or pictures adjacent the apertures can be utilized to establish context and meaning in a way that is natural to the user. Not only is a convenient information input/output device provided, but also the margin for error in the entry of information is minimized, due to the juxtaposition of the entry/exit port with information which enables the individual to decide whether or not to select the entry/exit port. The subject input/output device reduces the number of functions an individual must perform to enter information, in that no typing skills or complicated mental manipulations are necessary. Thus, the subject input/output device provides an unobtrusive, natural interface for communicating with a computer.

In summary, the embedded fiber page acts as an information transducer or transduction device in which the informational state of an embedded fiber may be selected or detected depending on the intended mode of operation.

In one embodiment, man-machine communication is provided by applying a mark with a pencil or a similar instrument to the page at a particular entry/exit port which mark blocks the entry of ambient light to the fiber. Whether or not a fiber is transmitting light can be conventionally detected and decoded so as to provide input to an information processor. While this system utilizes ambient light, the same type of man-machine interface may be provided through the utilization of a non-ambient or "active" system-driven light source.

In an active system, a light source is positioned at one end of a fiber and a light detector at its other end, and the fiber is separated at a point under an entry/exit port so that adjacent fiber ends are in spaced-apart axial alignment. Occluding material is then selectively applied at the port so that the material is deposited in the area between the separated end of the fiber. Without occluding material there is sufficient transmission of light from one severed end to an adjacent severed end of a fiber to provide an uninterrupted light path, whereas the provision of the occluding material between the spaced adjacent ends interrupts the light path.

Alternatively, an active system may be provided by aligning two fibers side by side, driving one fiber with light from a light source, and providing the other with a detector. Both fibers terminate at the same entry/exit port, and light transmission is accomplished by back scattering and reflection from the walls of the entry/exit port.

All of these embodiments are to be distinguished from the device described in the aforementioned U.S. Pat. No. 3,728,521 in that in the subject system, the entry/exit ports are available at the surface of the page, which permits encoding by one other than the manufacturer.

The subject input/output device can take on many convenient forms. It may be used as a catalog sheet so that catalog ordering may be simply accomplished by marking the catalog sheet adjacent the description of the item ordered. Each page of the catalog may be connected by an optical fiber coupling link to a decoding unit which is in turn coupled to a modulator/demodulator (modem). The modem connects the user directly to the manufacturer's computer by a telephone link. Thus, the person entering orders merely marks the catalog sheets anywhere it is convenient to do so, with ordering being accomplished by plugging the sheets into a decoder/modem unit.

The subject input/output device may also be utilized in a game format in which answers to game questions are transmitted optically to a decoder. The system may be arranged such that a decoded answer results in the driving of selected fibers to indicate to the user whether or not the response was acceptable in the game format. Such games include the so called "scratch and win" lottery games in which preprinted occlusive material is removed from the surface of a game card by scratching.

The fiber optic embedded paper may, of course, be utilized for educational or training material, or indeed for any type of input to a computerized system. User responses can also take the form of drawing rather than button-pushing or knob-twirling. Moreover, the stimulus presented to the user can consist of clear, full-color pictorial material. Computer feedback can be provided in a dynamic, graphic manner via light-output display.

The subject device can be employed in office automation. For example, responses to office memoranda can be generated via the annotation of a page by a reader. These responses can be electronically collected, avoiding the time delays and errors of mailing and sorting.

Up to this point, the coding of single optical paths has been described in terms of a convenient system of selectively blocking light in the fiber optic light path. In order to reduce the total number of fibers needed for a given number of apertures, an orthogonal matrix of fibers may be embedded in a paper, in which the coupling between a predetermined row and a predetermined column is provided by an optical coupling fiber spliced between the two at a crossover point. Each coupling fiber is separated intermediate its ends under an entry/exit port. The splice may either be made light conductive or non-conductive depending upon the absence or presence of occluding material deposited through the entry/exit port which overlies the separation provided in the coupling fiber. Thus, information is specified through the selectable occluding of linkages between rows and columns. The row/column location of the occluding material may be decoded from the matrix by conventional strobing or addressing techniques.

It is therefore a feature of the subject invention to transduce visible markings upon paper into electronically manipulatable information without the use of conventional optical character recognition hardware. The paper itself serves as the primary information transducer by means of the optical fibers embedded in the page. Moreover, in a two-way system, appropriately driven light sources may provide the user with a display of information at the page.

It will be appreciated that three functions are carried out in order to mechanize the transduction process. First, the input function is realized by marks applied to a page with a pencil or similar instrument. Second, optical signal information regarding the presence and location of marks is produced by a resultant blocking of light within optical fibers embedded on the page. Finally, optical-to-electronic signal transduction is produced by photodetectors associated with the fibers, with the state of the photodetector outputs unambiguously characterizing the presence and location of marks on the page.

BRIEF DESCRIPTION OF THE DRAWINGS

These and other features of the subject invention will be better understood in connection with the detailed description taken in conjunction with the following drawings, of which.

DETAILED DESCRIPTION

Figure 1:
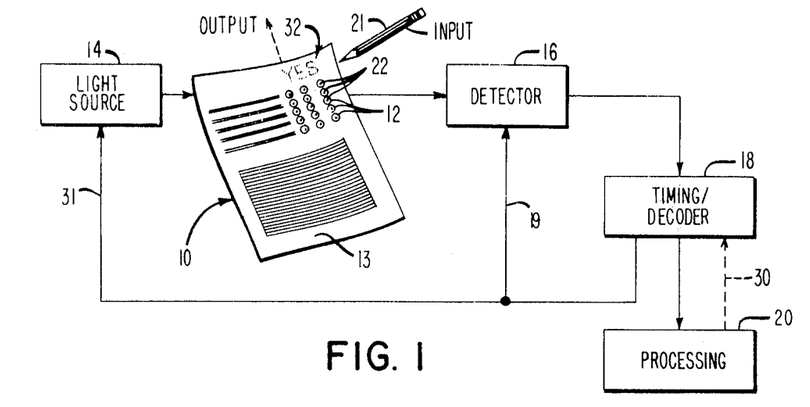
FIG. 1 is a block diagram illustrating the utilization of an embedded fiber page having surface entry/exit ports with processing apparatus.

A system utilizing the subject input/output device is illustrated in FIG. 1 in which an embedded fiber paper 10 having surface entry/exit ports 12, is interposed between a light source 14 and a detector array 16. In one embodiment, entry/exit ports 12 are in the form of pinhole size apertures in the top surface 13 of the paper, and, as will be described, each overlies an end of an embedded optical fiber, the other end of which is led through the paper to the edge of the paper or beyond. Depending on the mode of operation, light source 14 either may illuminate the entire page as would be the case with ambient light, or, in the case of the device being utilized as an output or display device, may include an array of light sources associated one each with an embedded fiber. The detector array in general includes a number of detectors associated one each with an optical fiber. The output of detector array 16 is coupled to a timing/decoding unit 18 which is in turn coupled to a processing unit 20. In the embodiment illustrated, manual input is provided through the utilization of a pencil 21 which is used to mark directly on the paper in selected locations, thereby to encode paper 10.

The ports designated as entry ports for the paper are surrounded by circles 22, with entry ports 12 located at the centers of the circles. In one embodiment, the entry ports are no bigger than a pinhole, although the size may vary depending on the marking device or fiber utilized. As described hereinbefore, the depositing of graphite or pencil lead into an aperture or perforation forming entry port 12, blocks light from entering an underlying fiber. The mark determines the optical state of the underlying fiber, i.e. conducting light or not, which is subsequently sensed by a detector in detector array 16. In order to scan or address a given detector, timing and decoding signals from timing and decoding unit 18 are applied over line 19 to detector array 16, such that the presence or absence of marks at the individual entry ports may be ascertained. The output of timing/decoding unit 18 may be further processed at a processing unit 20 so that information manually entered by marking paper 10 may be utilized.

Alternatively, signals from processing unit 20 may be coupled as over dotted line 30 to the timing/decoding unit. Signals decoded at unit 18 are coupled over line 31 to activate the aforementioned array of light sources for driving selected fibers within page 10. By way of illustration, this results in a display of the word "YES" as indicated at 32. When light source 14 is driven so as to illuminate selected fibers, the associated apertures or perforations act as exit ports and emit light, the pattern of which provides the display.

Thus, the embedded fiber paper acts in two modes, the first being as an input device, and the second as an output device. In the first mode, light source 14 serves to illuminate the ends of fibers within the paper or page, with the encoding being provided by the blackening of a selected circle or circles. In the second of the above described modes, light source 14 takes on the form of an array of light sources, with selected light sources being utilized to drive selected fibers, thereby to provide the display.

Moreover, it is possible to provide a matrix of fibers for the purpose of reducing the number of fibers required for a given number of entry/exit ports. As will be described, the matrix may be scanned in raster scan fashion, with the sensing of a crossover point being accomplished by activating the detector at a selected row when a selected column is driven with the light source.

Ambient Light Systems

Figure 2:
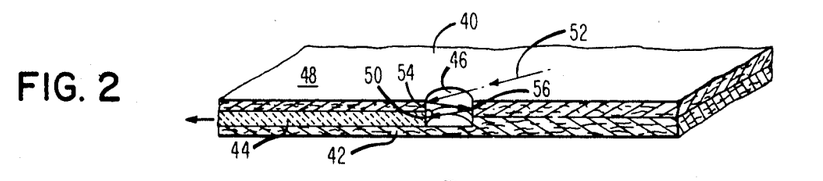
FIG. 2 is a cross-sectional diagram illustrating ambient light entering a surface entry/exit port provided in a page having an embedded optical fiber.

Referring now to FIG. 2, the subject input/output device may be in the form of a laminated paper, which in one embodiment includes a top layer 40 and a bottom layer 42, in between which is sandwiched an optical fiber 44. While the subject invention will be described in terms of overlying paper layers, it will be understood that the lamination materials may be of any suitable type. Also, apertures may be made on both surfaces of the page. The laminar structure of FIG. 2 is provided with an entry/exit port in the form of an aperture or hole 46 through the top surface 48 of the laminar structure, which aperture extends downwardly until it clears the face or end 50 of optical fiber 44.

In operation, light enters aperture 46 as illustrated by line 52. Thereafter, the light either directly enters end 50 of optical fiber 44, or is reflected as illustrated at 54 and 56 by the interior walls of the aperture and then enters end 50.

In one embodiment, the optical fiber is four mils in diameter, and the thickness of each paper layer is four mils. The paper layers or sheets may be adhered to each other in a conventional manner with adhesive. Assuming the use of pressure sensitive adhesive, when the optical fibers are to be sandwiched between two sheets, all that is necessary is to lay out the fibers on the sheet containing the pressure sensitive adhesive and then place a cover sheet such as sheet 40 over the structure. Thereafter, apertures may be provided at selected locations at the end of predetermined optical fibers.

Figure 3:
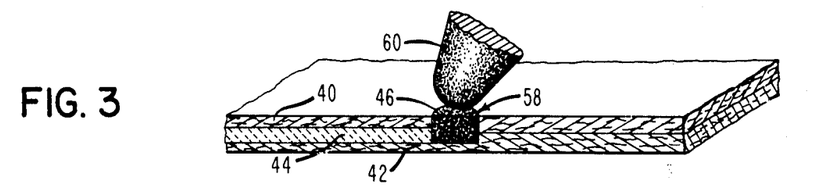
FIG. 3 is a cross-sectional diagram illustrating the depositing of occlusive material into an entry/exit port aperture by means of a pencil.

Referring now to FIG. 3, when it is desired to prevent light from entering end 50 of optical fiber 44, occlusive material 58 is deposited in aperture 46. In one embodiment, the occlusive material may be pencil lead or graphite, with the depositing of graphite being accomplished by the marking of the aperture with tip 60 of a conventional pencil.

Figure 4:
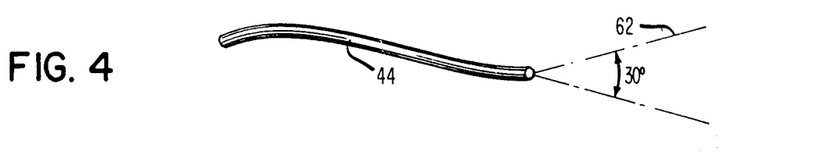
FIG. 4 is a diagramatic illustration of an optical fiber illustrating its acceptance cone.

Referring now to FIG. 4, the acceptance cone 62 of fiber 44 is illustrated as being relatively narrow, generally on the order of 30°, resulting in a half angle of 15°. In the configuration of FIGS. 2 and 3, only one half of the acceptance cone is utilized since light enters the fiber only from the region above the fiber end. Although an optical fiber has a limited acceptance cone, light is able to enter this cone both because of non-normal rays entering the aperture, and because of scattering within the aperture itself.

Figure 5:
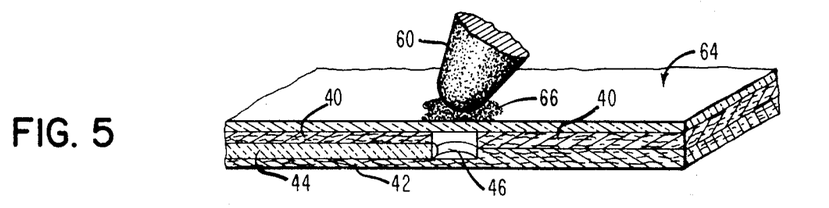
FIG. 5 is a cross-sectional diagram illustrating the page of FIG. 2 provided with a light transmissive layer which permits the provision of occlusive material immediately above the surface entry/exit port, thereby to provide eraseability for the subject system.

Referring now to FIG. 5, when eraseability is required, a transparent layer 64 is positioned over layer 40, with a mark 66 of occlusive material preventing light from entering aperture 46. In the embodiment illustrated, mark 66 is provided by tip 60 of a conventional pencil. The use of a transparent cover sheet allows printed material on layer 40 to be viewed through layer 64.

Thus, FIGS. 2 through 5 illustrate a passive ambient light embodiment of the subject invention in which encoding of the paper is accomplished by the deposition of occlusive material at or adjacent the end of an optical fiber embedded in the laminar structure illustrated.

Active Systems

Figure 6A:
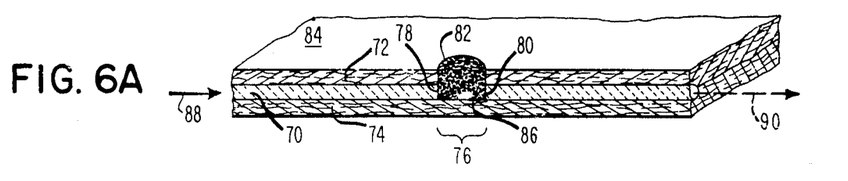
FIGS. 6A and 6B are cross-sectional diagrams illustrating the provision of a page provided with an optical fiber separated along its length under a surface entry/exit port.
Figure 6B:
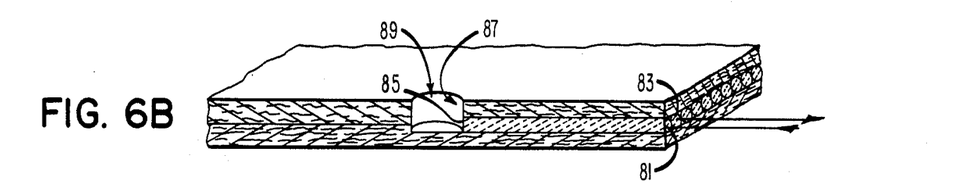

Use of active light sources such as light emitting diodes (LED's) rather than ambient light can simplify the task of signal detection by enhancing the signal-to-noise ratio. In order to provide an active system so as to improve the signal-to-noise ratio, as illustrated in FIG. 6A an optical fiber 70 is sandwiched between two layers 72 and 74, and is separated at a region 76 such that ends 78 and 80 of the fiber are in spaced axial alignment within the laminated structure. An aperture 82 is provided through top surface 84 of the laminated structure, and occlusive material 86 may be selectively placed in the aperture to prevent light entering as illustrated at 88 from exiting as illustrated at 90, thereby to provide means for altering the informational state of the optical path defined by optical fiber 70. Note that with gaps or separations on the order of four mils wide and fibers having a four mil diameter there is sufficient optical transmission between the separated axially aligned faces of the fiber, as discussed below. Thus, a sufficient amount of light is transmitted across the gap, absent occlusive material therein. Moreover, the fiber may be separated by merely drilling or punching through top surface 84 and through the optical fiber 70, thereby simultaneously creating both the aperture and separating the fiber into sections. Alternatively, as shown in FIG. 6B, two fibers 81 and 83 are located side-by-side, with the ends 85 and 87 of both fibers exposed at an aperture 89. When no occlusive material is deposited in this aperture, narrow bandwidth light from fiber 81 is scattered by the walls of aperture 89 and is reflected back through fiber 83. The deposition of occlusive material within the aperture blocks this back-reflection of light through fiber 83.

The FIG. 6 embodiments provide simple physical configurations for an embedded fiber paper which is utilized with an active system in which a light source is positioned at one end of a fiber and a detector at the end of the same or another fiber. The systems illustrated in FIGS. 6A and FIG. 6B do not, therefore, depend on ambient light and result in an enhanced signal and simplified signal detection for the entire system.

Applications

Figures 7A, 7B:
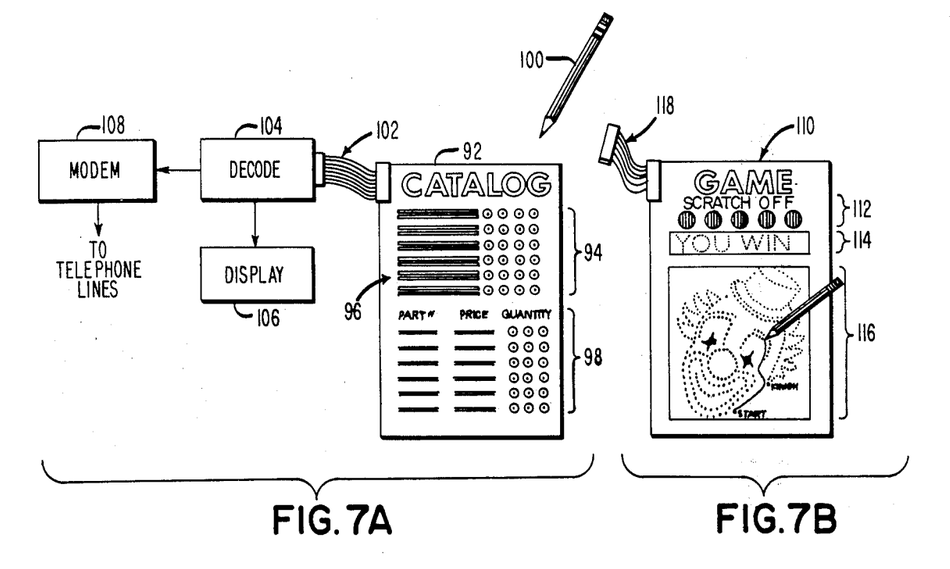
FIGS. 7A, 7B, and 7C are diagramatic illustrations of the utilization of the subject invention as a catalog sheet, as a game card, and a page in a book respectively.
Figure 7C:
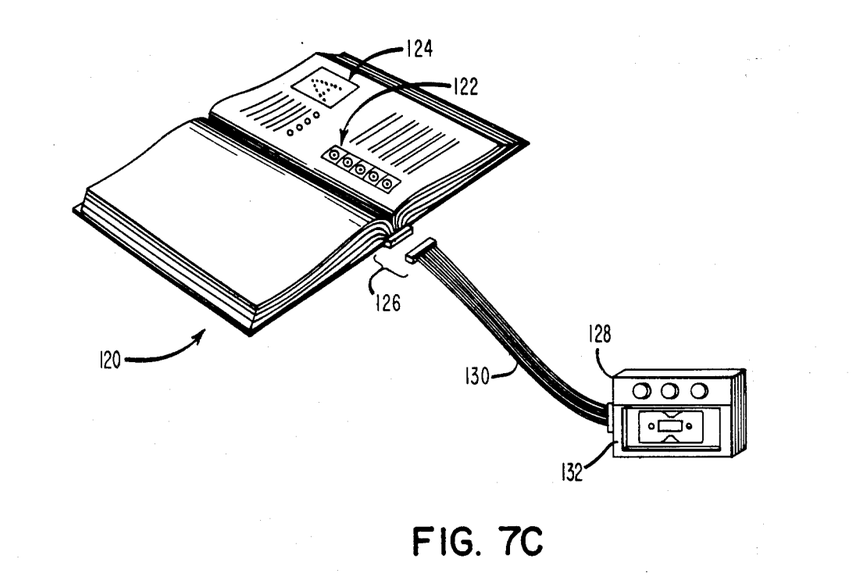

Referring to FIGS. 7A, 7B, and 7C, what is illustrated is a variety of different applications for the subject input/output device. Referring to FIG. 7A, a catalog sheet 92 may be provided with a series of entry ports 94 adjacent written material generally indicated at 96. Moreover, a part number, price-quantity matrix 98 may be provided at the bottom of a catalog sheet, with entry ports as illustrated. Note that the user is relieved of error-prone detail such as recording the part number or price, since that information can be retrieved from knowledge of which apertures have been marked. Thus, the marking of the catalog sheet by a pencil 100 provides all of the necessary information, such that when the catalog is connected by a fiber optic cable 102 to a decoding unit 104, the information encoded in the catalog sheet may be read out and displayed at 106 or provided to a modem 108 for direct transmission to a manufacturer.

As illustrated in FIG. 7B, the subject input/output device may be in the nature of a game in which a game card 110 is provided with scratch-off indicia 112. The card is provided with appropriate entry ports for the optical fibers underneath the indicia. Only selected cards will have optical ends at the required scratch-off points such that only when these cards have these entry ports exposed to ambient light will it indicate that the user of the card has won. The card may be provided with a display area 114 which provides the player with a visual representation of the fact that the player has won when selected entry/exit ports are appropiately driven. Of course many types of games may be played in this manner with a connect-the-dots game being shown at 116. As in the case of the catalog sheet, the game card may be coupled via a fiber optic link 118 to any type of processing system either in the vicinity of the card or at a remote location.

As illustrated in FIG. 7C, a textbook 120 may be provided not only with entry ports generally at 122, but also with a display such as illustrated at 124, with the book being coupled at its binding via a connector generally indicated at 126 to a local processing unit 128 by a fiber optic cable 130. Processing unit 128 may include light sources and detectors as well as decoding and encoding circuitry. This unit may be augmented by any type of auxiliary processing unit 132, which may include cassettes, microprocessors, a modem for telephone linkage to a remote computer, and the like. The fiber optic page in book format allows the inexpensive medium of print to be combined with the advantages of computer-driven feedback to the user. In the process, the user is permitted to exercise a broad range of computer-readable, graphic actions, instead of being restricted to button-poking or knob-turning.

Use Of Multiple Port Fibers

Figure 8:
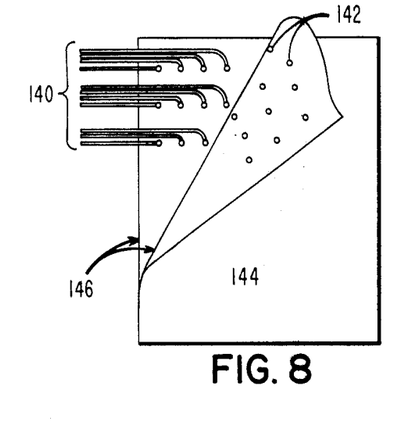
FIG. 8 is a diagramatic illustration of one embodiment in which each fiber has associated with it one entry/exit port.

Referring now to FIG. 8, an embodiment is illustrated in which optical fibers 140 are associated one each with a single entry/exit port 142 provided through a page 144 of laminated structure 146. This figure illustrates a two port approach, with the term "two port" referring to the fact that a single fiber has two termination points and that information transfer occurs only between these two points. Note that in this embodiment each fiber corresponds uniquely to a point on the page so that the points which have been marked are readily determined by which fibers have their outputs blocked.

Figure 9:
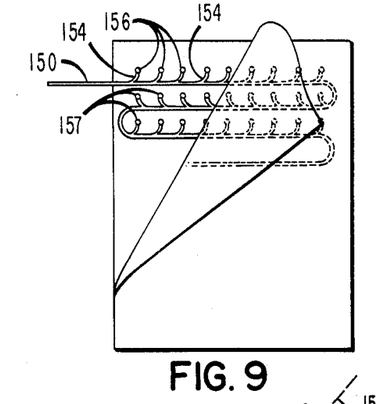
FIG. 9 is a diagramatic illustration of the utilization of a serpentined fiber embedded in a sheet to which is coupled individual optical fibers associated one each with an entry/exit port.
Figure 10:
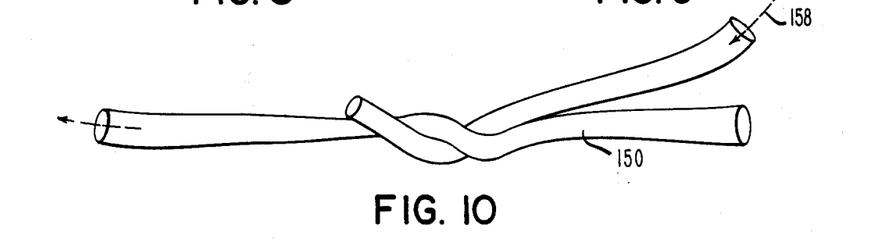
FIG. 10 is a diagramatic illustration of one method for splicing optical fibers together.

Referring to FIG. 9, a multi-port configuration is illustrated in which a carrier fiber 150 has coupled to it a large number of fibers 154 which are associated one each with an entry/exit port 156. The purpose of the multi-port approach is to reduce the number of fibers leaving a page without reducing the number of points capable of being sensed. In the approach illustrated in FIG. 9, transmission paths are successively combined. Physically, there are a variety of coupling techniques for combining transmission paths available in the prior art. One example is the biconical tapered and fused coupler of FIG. 10 in which light 158 from an entry/exit port is coupled to carrier fiber 150 by virtue of the twisting and fusing of the fibers as illustrated, it being a property of the coupling that light 158 will be coupled into fiber 150. Splices of the type described in FIG. 10 are described in an article by J. D. Dalgleish, entitled "Splicers, Connectors, and Power Couplers for Field and Office Use", Proceedings of the IEEE Vol 68, No. 10 October, 1980, pp. 1229-30, and also in Mitre Corporation's "Designer's Guide to Fiber Optics" by Kleekamp and Metcalf.

Using ambient light and the multi-port approach of FIG. 9, position information is not immediately available because a number of individual fibers are fused to a single carrier fiber. That is, without suitable encoding to identify an individual fiber, it is impossible to decode the light output of the carrier fiber, so as to determine the positions of the marks on the page. Position information can be encoded or fibers identified by a variety of means including spectral techniques. For example, optical filters with non-overlapping spectral passbands can be positioned at the apertures by providing translucent films 157 or by doping the ends of the fibers. In this embodiment, the spectral content of the output signal unambiguously indicates which apertures have been marked.

Multiport Fibers And Active Light Sources

Figure 11:
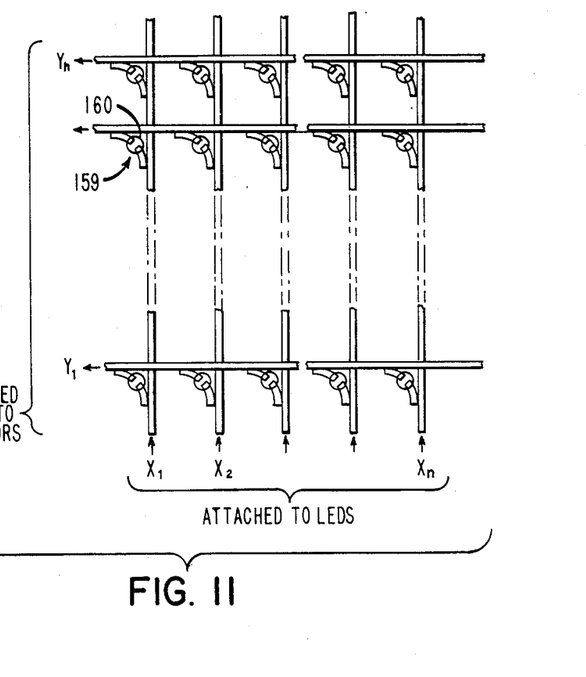
FIG. 11 is a diagramatic illustration of a matrix arrangement of fibers, illustrating the utilization of a selectably occludable coupling fiber.

Referring now to FIG. 11, a multi-port approach different from that illustrated in FIG. 9, utilizes an LED based strategy without requiring an entire fiber to be dedicated to a single aperture or position on the page (n fibers for n positions). In particular, with an orthogonal matrix, position information corresponding to $n^2$ points on the page is provided by only 2n fibers. The primary features of the design are that n fibers are used as light emitters and n fibers are used as light detectors. Suitable strobing or sequencing of light emission and light detection is capable of transforming the input marks on the paper into the desired optical signals so as to unambiguously specify which points have been marked. Let $X_1$ through $X_n$ denote vertical fibers (columns) and $Y_1$ through $Y_n$ denote horizontal fibers (rows). Assume means for coupling a row to a column at a particular crossover point, which coupling will be described hereinafter, then a strobing system for the subject matrix might require that the fibers $X_1$ through $X_n$ be strobed sequentially, with LEDS associated one each with a fiber. During the time interval that fiber $X_i$ is being strobed with light, fibers $Y_1$ through $Y_n$ are sensed for the presence or absence of a light signal. Assuming point $X_i$, $Y_j$ has been marked, this state will be detected via the absence of light on fiber $Y_j$ as a result of the X, Y connection pattern which will not be described.

At each X-Y intersection or crosspoint, a twisted and fused fiber coupler is provided as illustrated at 159, such that the fiber runs from a column to a row in the vicinity of a predetermined crossover point. This fiber is provided with a separation or gap immediately beneath an aperture in the surface of the laminated paper which operates in the manner described in connection with FIG. 11, such that is no occlusive material is placed in the aperture, here illustrated at 160, then light will be transmitted from, for instance, column $X_1$ to row $Y_{n-1}$. Alternatively, if occlusive material is placed in aperture 160, there will be no connection at the indicated crosspoint.

Light Attenuation Across a Gap

Figure 12:
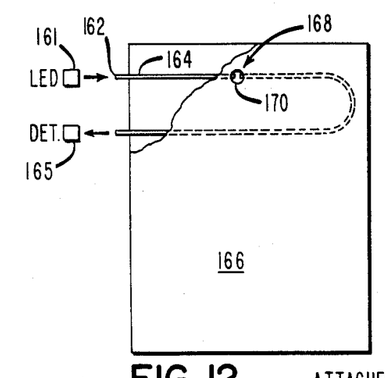
FIG. 12 is a diagramatic illustration of the utilization of a single optical fiber with an interruptable portion adjacent an entry/exit port.
Figure 13:
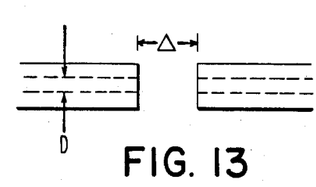
FIG. 13 is a diagramatic illustration describing optical transmission across a separation in a fiber in terms of the diameter of the optical fiber and spacing between fiber ends.
Figure 14:
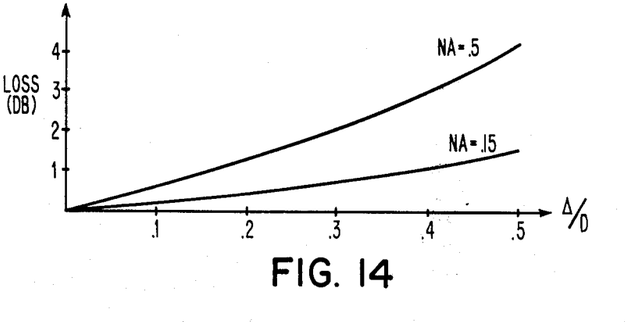
FIG. 14 is a graph illustrating the loss of light intensity from one fiber section to another in terms of the dimensions illustrated in FIG. 13.

Referring to FIG. 12, a two-port approach is illustrated in which an LED 161 is placed at one end 162 of a fiber 164 which is embedded in a sheet 166. Fiber 164 is split apart along its length at, for instance, 188 which is directly beneath an aperture 170 in sheet 166. The attenuation of light between the separated ends is a function of end separation and fiber core diameter, as well as the numerical aperture, with significant end separation being feasible without unduly large attenuation. Thus even with the split, the fiber provides an adequate transmission path for light. The relationship of light loss to separation and fiber diameter is illustrated in FIG. 14 for the parameters illustrated in FIG. 13, in which "Δ" indicates separation and "D" indicates diameter of the fiber, for numerical apertures of 0.5 and 0.15. It will be appreciated from inspection of FIG. 14 that the lower the numerical aperture, the lower the loss. As expected, the lower the ratio of separation to fiber diameter, the lower the loss.

Connector Structures

Figure 15:
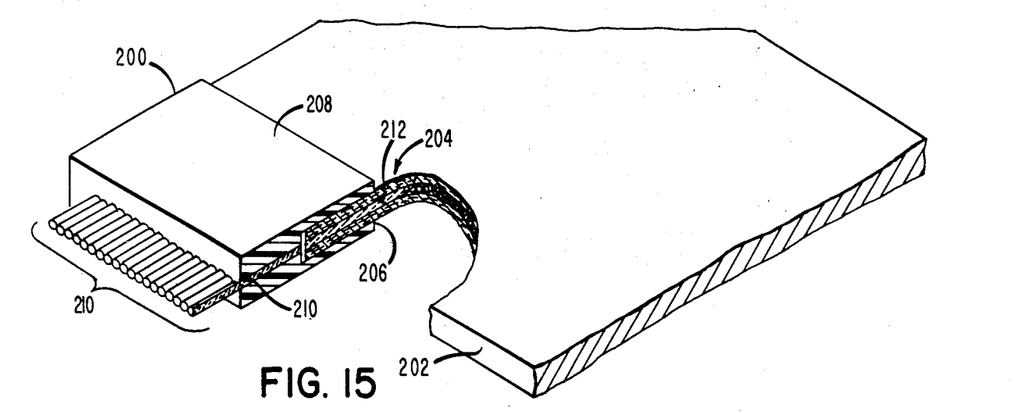
FIG. 15 is a cross-sectional and diagramatic illustration of one type of fiber optic connector which may be utilized to couple the embedded optical fibers to processing equipment.
Figure 16:
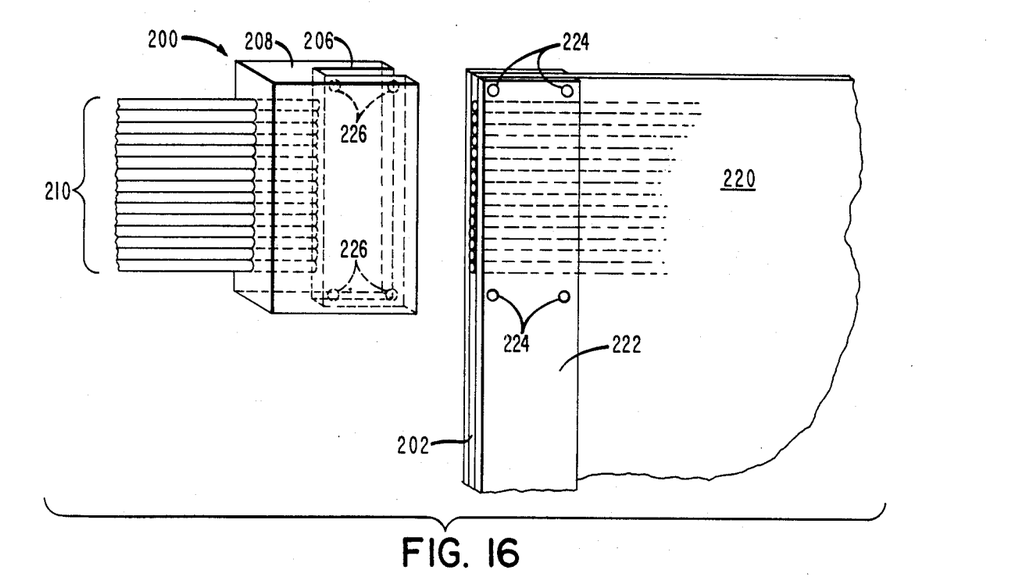
FIG. 16 is a diagramatic illustration of the connector of FIG. 15 shown positionable at the edge of an embedded fiber paper, in which the embedded fiber paper is provided with a reinforcing strip and positioning detents.

While the subject invention is envisioned as being utilized with a fiber bundle extending out from the edge of each page, referring to FIG. 15, it may be convenient to provide a connector 200 which overlies a page edge 202 such that a page 204 is sandwiched in a channel 206 in connector housing 208. Within the housing is embedded an array of optical fibers 210 which, when the connector is slipped over the page, are in optical alignment with fibers 212 embedded in the page. This type of connector is useful in providing an optical link between the input/output device and processing apparatus. It will be appreciated that the alignment of the fibers embedded in the housing with the fibers embedded in the page may be accomplished by locator pins or detents, as shown in FIG. 16, in which a page 220 may be provided with a reinforcing strip 222 having locator detents 224 formed integrally therewith. Connector 200 is provided with corresponding detent receiving apertures 226 such that when the connector is slipped over edge 202, its location relative to the fibers in the paper is established by "feel".

Light Pen Embodiments

Figure 17:
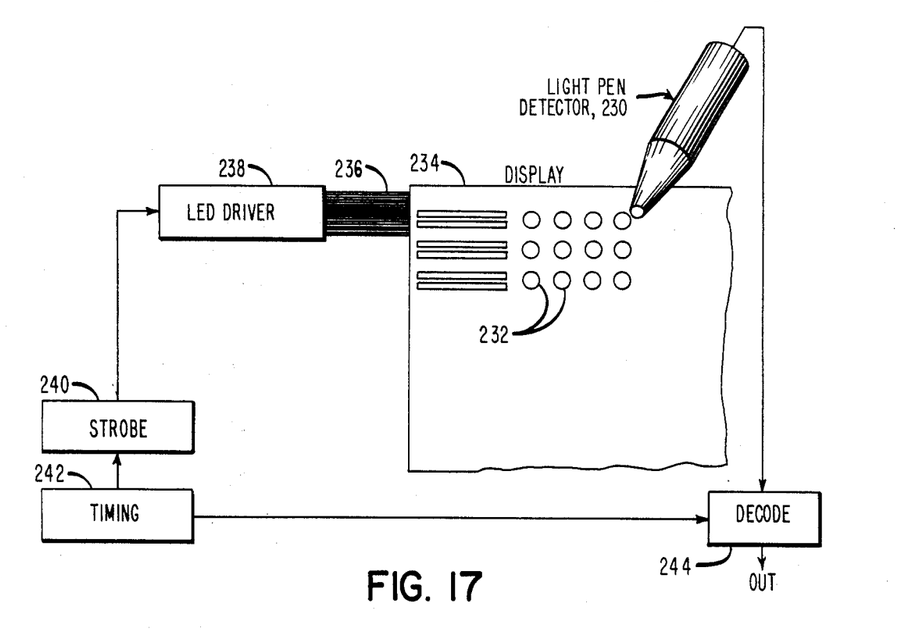
FIG. 17 is a block and diagramatic illustration of the subject input/output device used with a light-detecting pen; and, FIG. 18 is a block and diagramatic illustration of the subject input/output device used with a light-emitting pen.

Embedded optic fiber paper can be used in conjunction with a light detecting or light emitting pen. For instance, as illustrated in FIG. 17, an embedded optic-fiber page 234 may be used with a light pen detector 230 so as to determine the position of entry/exit ports 232 being pointed at by the pen. Entry/exit ports 232 are linked via optical fibers 236 to a light emitting diode driver 238 which is strobed via a strobing unit 240 in response to timing signals from a timing unit 242, the output of which is also coupled to a decode unit 244. The output of light pen detector 230 is also coupled to decode unit 244. By strobing the fibers in a controlled timing sequence, a "hit" detected by the pen can be converted into position information. Spurious hits are avoided by switching on the pen via a contact switch (not shown) only when positioned over a selected aperture. The actual placing of a mark is unnecessary in this mode of operation, but may be included for the user's later reference.

Figure 18:
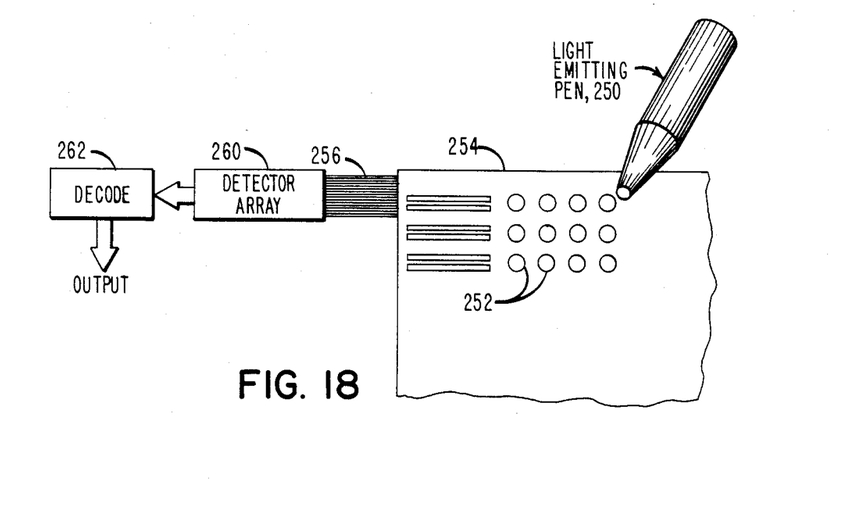

Alternatively, and referring to FIG. 18, a light emitting pen can be used with fiber optic paper that is connected to a detector array. In this embodiment, a light emitting pen 250 is positioned over one of the entry/exit ports 252 in an embedded fiber paper 254, with the ports being connected via fibers 256 to a detector array 260. The output of the detector array is coupled to a decode unit 262 which identifies the entry/exit port at which the light emitting pen is located and thus decodes the position of the pen. In operation, the pen emits light of a particular bandwidth and intensity level which is directed into a selected aperture when triggered by a contact switch (not shown). The light is transmitted to the detector array through the underlying fiber, thereby enabling the selected aperture to be identified photoelectrically. It will be appreciated that decode unit 262, in one form, records the presence of a light intensity greater than a predetermined threshold.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. An input/output device in the form of a page having one or more optical fibers therein, said device being selectively codeable by an individual using the device, the one or more optical fibers being capable of being switched, after manufacture, by said individual from one informational state to another, each of said fibers having a normal light-transmissive state and a non-light-transmissive state in which the selection of the informational state of an optical fiber is selectively codeable in real time from a position readily accessible by the individual at a designated location on a surface of the page, the device comprising:

a thin, planar sheet having opposed surfaces, a plurality of edges, and one or more designations on one of said surfaces at one or more predetermined locations;

at least one optical fiber embedded in said thin sheet, said fiber being divided into two sections to provide two ends embedded in the sheet, said embedded ends having faces orthogonal to the longitudinal axis of said fiber, the embedded ends being spaced apart by an amount which permits light transmission therebetween such that light in one section of the fiber is transmitted to the other section of the fiber across an interface established by said embedded ends for establishing the normal light-transmissive state of said fiber;

the designation-containing surface of said sheet having at least one aperture therethrough associated with a respective designation, said aperture extending through said designation-containing surface to the space defined by the corresponding spaced-apart ends, said embedded ends being disposed within said aperture;

each section of said fiber extending within the plane of said thin sheet to an edge thereof; and means insertable from said apertured surface through said aperture into the space defined by the spaced-apart embedded ends for selectively changing the normal light-transmissive state of said fiber to the non-light-transmissive state by occluding the space between said embedded ends, such that the state of said optical fiber embedded in said thin planar sheet is readily changeable from one state to the other from the designation-containing surface of said device after the manufacture thereof, thereby to permit real-time coding of said device by the individual using said device.

2. The input/output device of claim 1, wherein said page includes at least two sheets laminated together with said optical fiber embedded therebetween, one of said sheets forming said designation-containing surface and having said aperture therethrough.

3. The input/output device of claim 1 wherein said sheet contains a plurality of said optical fibers embedded therein;

the designation-containing surface of said sheet having a plurality of apertures therethrough, the spaced-apart embedded ends of each of said optical fibers being disposed within a respective aperture.

4. The input/output device of claim 1 wherein said means insertable from said apertured surface includes means for selectively depositing occlusive material in said aperture.

* * * * *